W. H. COLDWELL.
MOTOR LAWN MOWER.
APPLICATION FILED JUNE 21, 1910.
1,012,521.
Patented Dec. 19, 1911.
3 SHEETS—SHEET 2.
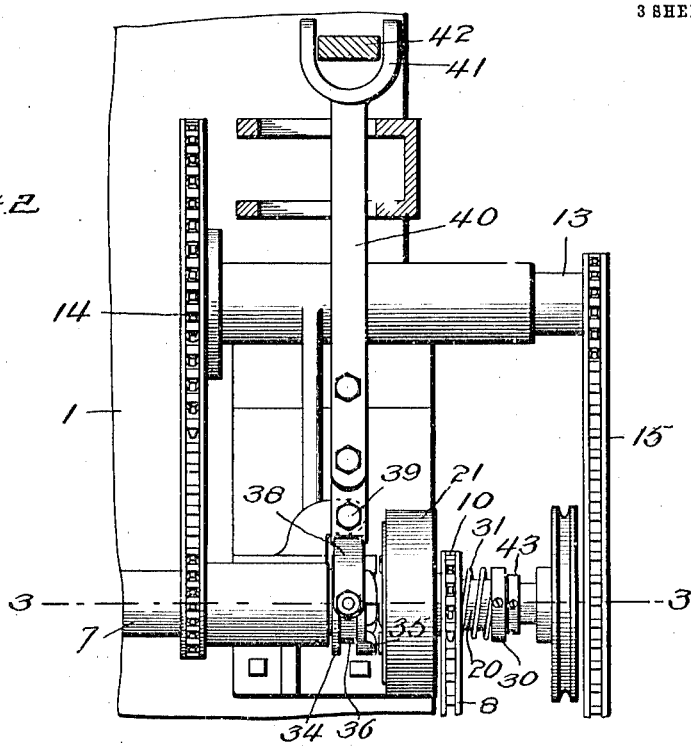
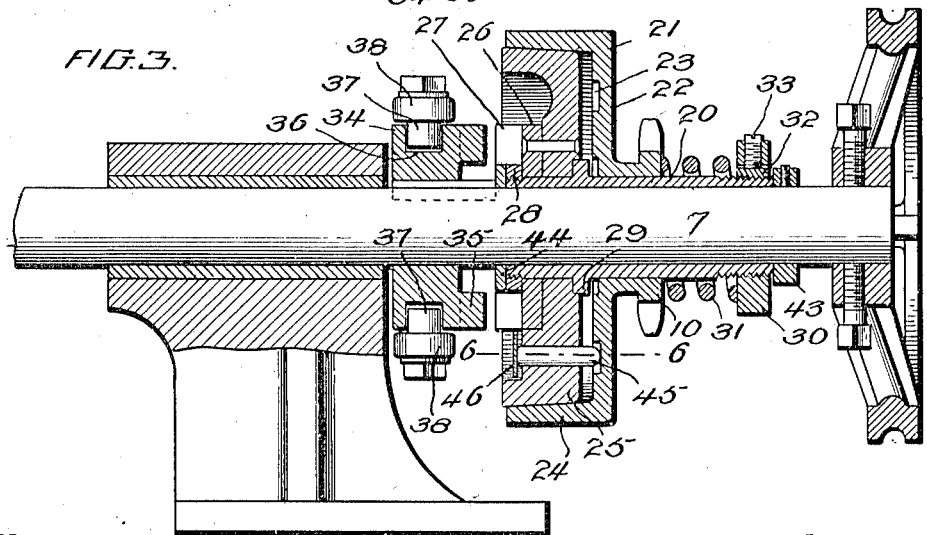

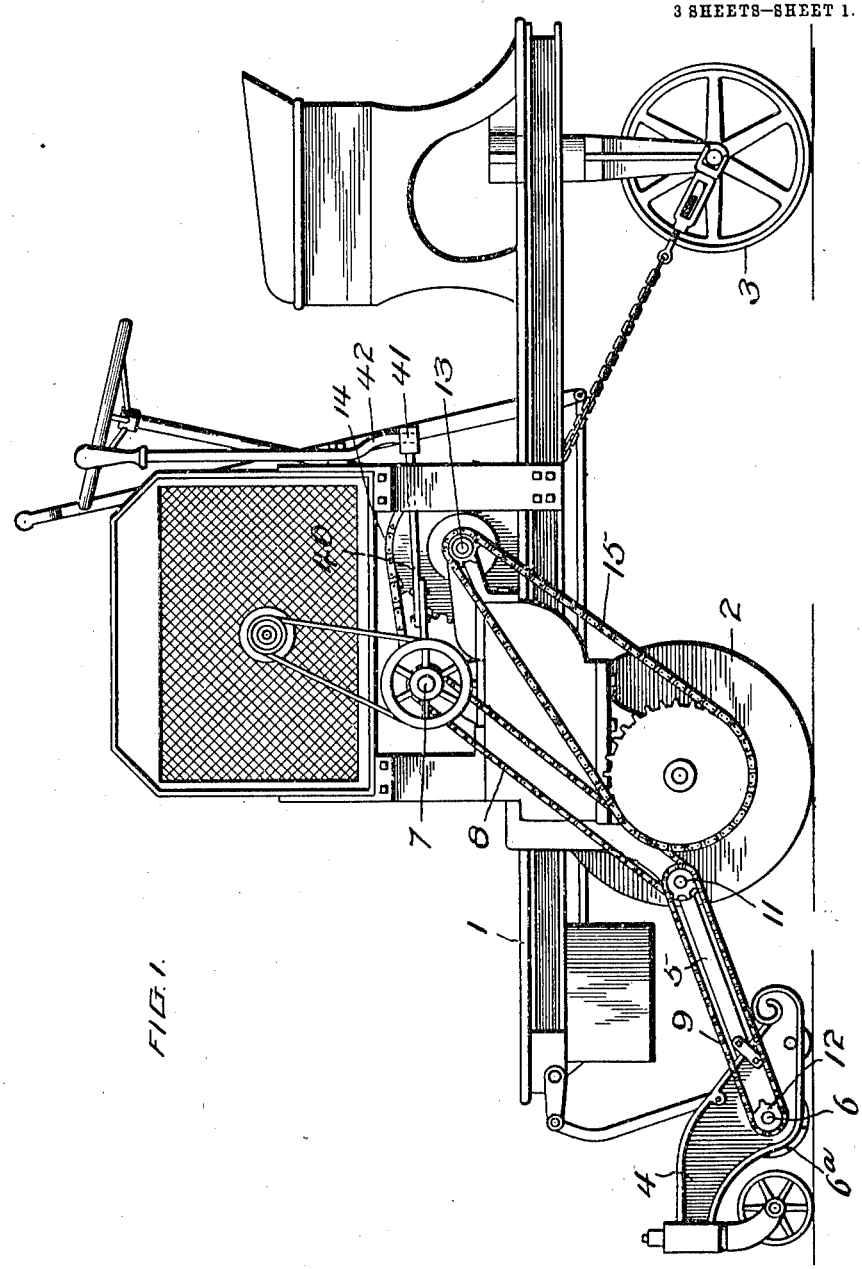

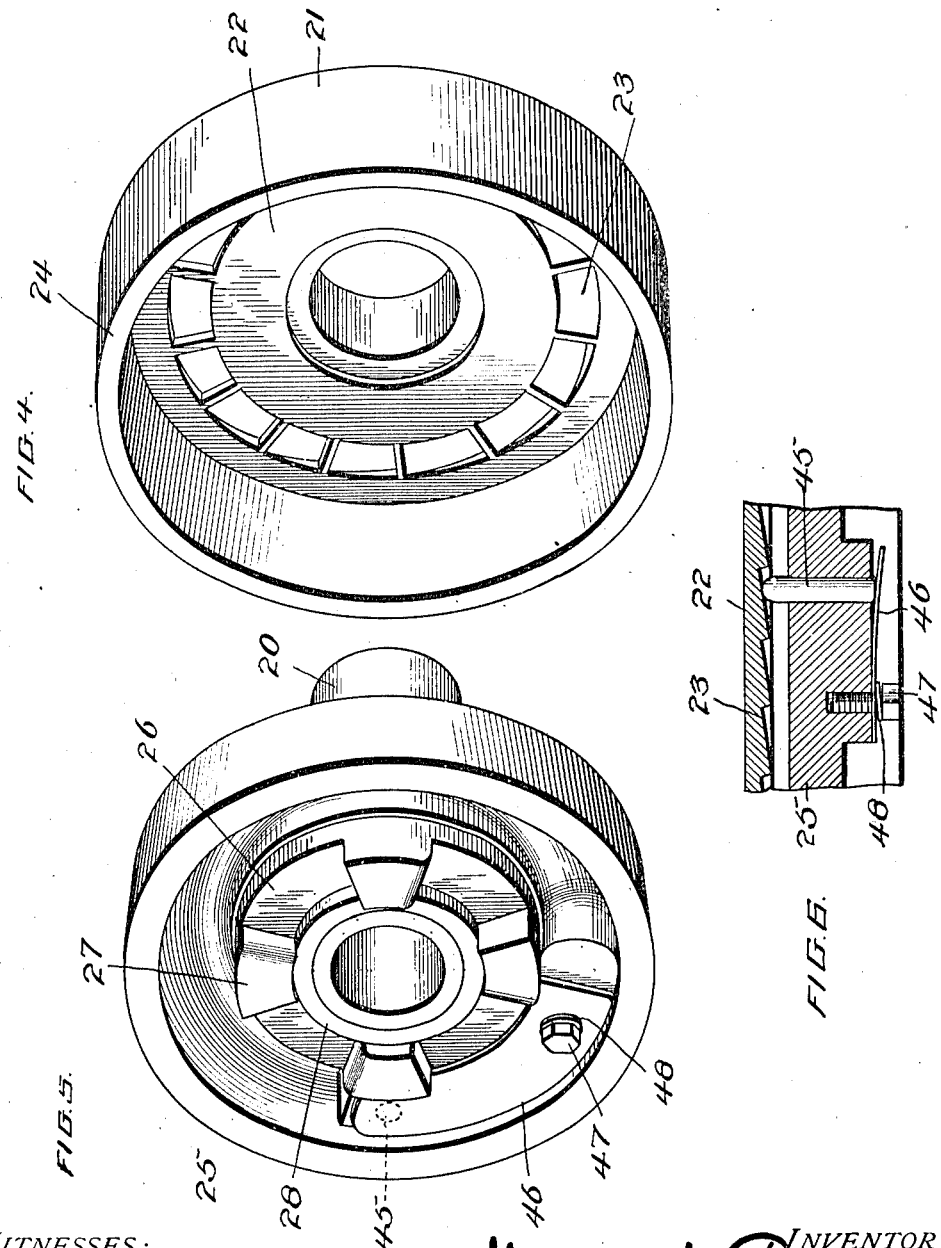

UNITED STATES PATENT OFFICE.

WILLIAM H. COLDWELL, OF NEWBURGH, NEW YORK.

MOTOR LAWN-MOWER.

1,012,521.   Specification of Letters Patent.   Patented Dec. 19, 1911.

Application filed June 21, 1910. Serial No. 568,195.

*To all whom it may concern:*

Be it known that I, WILLIAM H. COLDWELL, citizen of the United States, residing at Newburgh, in the county of Orange and State of New York, have invented certain new and useful Improvements in Motor Lawn-Mowers; and I do hereby declare the following to be a full, clear, and exact description of the invention, such as will enable others skilled in the art to which it appertains to make and use the same.

My invention consists in the novel features hereinafter set forth, reference being had to the accompanying drawings which illustrate one form in which I have embodied the same and the invention is fully disclosed in the following description and claims.

Referring to the said drawings, Figure 1 represents a side elevation of a motor lawn mower having my invention embodied therein. Fig. 2 is a plan view of a portion of the power transmitting mechanism of the machine showing the embodiment of my invention which I have selected for purposes of illustrating the invention. Fig. 3 represents a vertical section on line 3—3 of Fig. 2. Fig. 4 is an enlarged perspective view of the female member of the friction clutch. Fig. 5 is a similar view of the male member, of the friction clutch and one member of the positive clutch. Fig. 6 is an enlarged horizontal section on the line 6—6 of Fig. 3.

In the operation of lawn mowers and particularly motor lawn mowers, it frequently happens that the revolving cutter is stopped, as by a stick or stone lodging between a blade of the rotary cutter and the stationary knife bar, or otherwise, in which case, some part of the mechanism is liable to be injured. This is particularly the case in motor driven lawn mowers, where owing to the large amount of power available, such an accident is likely to break the chain or other gearing transmitting motion to the revolving cutter.

The object of my invention is to provide means whereby the revolving cutter may be stopped instantly without causing any injury to the mechanism for driving the same, and to combine therewith means for notifying the operator that the cutter has been stopped, in order that he may shut off the power and remove the obstruction which has caused the stoppage, and further to provide a device of this character which can be accurately adjusted to produce the desired result, and which will not be affected in its operation by the operation of throwing the clutch mechanism connecting it with the source of power, into or out of operation.

In the embodiment of the invention herein selected for purposes of illustration, the device is shown in connection with a motor lawn mower of the Coldwell type, such as is shown for example in Letters Patent of the United States No. 669,437 granted to Thomas and William H. Coldwell, March 5, 1901, and the invention will be explained as it is constructed and applied to this machine, it being understood that the mechanism may also be advantageously used in other types of lawn mowers, or motor lawn mowers, and in other kinds of machinery as well.

In Fig. 1 I have shown a side elevation of a Coldwell motor lawn mower, in which 1 represents the motor truck or frame supported upon the traction and lawn rolling rollers 2 and the steering roller 3. The mower frame which is indicated at 4, is propelled in front of the motor frame by loosely jointed push arms 5, 5, and carries the usual stationary cutter and the rotary cutter 6ª, the shaft of which is indicated at 6. 7 represents the driving shaft of the machine, which is connected with a suitable motor, and is directly connected with the shaft 6 of the rotary cutter by sprocket chains 8 and 9, the chain 8 engaging a sprocket 10, on the driving shaft, and one of a pair of connected idle sprockets 11, 11, mounted on a stud concentric with the pivotal connection of the arms 5 with the motor frame, and the chain 9 engages the other sprocket 11 and a sprocket 12 on the shaft of the rotary cutter. This arrangement permits the mower frame to rise and fall with respect to the motor frame without disturbing the driving connections, and the loose connections of the arms 5 with the motor frame and mower frame permits the mower frame to rock transversely and longitudinally with respect to the motor frame to accommodate itself to variations in the surface of the ground. The driving shaft is connected with a second motion shaft 13, by a sprocket chain 14, and the shaft 13 is connected by chain 15 with the traction and lawn rolling rollers, which are driven at a slower speed than the revolving cutter.

Referring now to Figs. 2 to 6 inclusive, the driving shaft 7 is provided with a loose sleeve 20, preferably made of brass and upon this sleeve is loosely mounted one member of a friction clutch, in this instance the female member of a cone clutch, indicated at 21, which is shown detached in Fig. 4. The clutch member 21 comprises a disk portion 22, provided with an annular series of shallow ratchet teeth, or serrations 23 and a friction rim or flange 24 having its interior coned and forming a friction surface. The clutch member 21 is secured to (or has formed integrally with it) the driving sprocket 10 for operating the rotary cutter, and is capable of slight movement longitudinally of the shaft. 25 represents the other member of the friction clutch, which is rigidly attached to the sleeve 20 and consists of a casting having a conical peripheral friction face to fit within the clutch member 21. I also secure rigidly to the sleeve 20 one member of a positive clutch shown at 26, provided with teeth or projections 27. In this instance the clutch member 26 is riveted to the cone 25, and the two clutch members 25 and 26 are rigidly secured to the sleeve by means of a nut 28 screwed on a threaded portion at one end of the sleeve, and clamping the clutch members between it and an annular rib 29 with which the sleeve is provided. The other end of the sleeve is provided with an adjusting nut 30 on a threaded portion of the sleeve, and a spiral spring 31 is interposed between the adjusting nut and the sprocket 10 and clutch member 21. By adjusting the nut 30, the frictional resistance between the clutch members 21 and 25 can be accurately adjusted, and the nut 30 is provided with locking means for securing it in adjusted position. In this instance the nut 30 is provided with a recess on its interior, in which is fitted a clamping plate 32, threaded on its inner side to conform with the threading of the nut, and this plate is clamped against the threaded portion of the sleeve 20 by set screw 33, when the desired adjustment of the spring has been secured. 34 represents the movable member of the positive clutch, mounted on the shaft 7, so as to turn therewith but movable longitudinally thereof, being in this instance connected to the shaft by a key or feather 34ª, and provided with teeth or projections 35 to engage those of the fixed clutch member 26 and with an annular groove 36 to receive studs 37 on a yoke 38, pivoted at 39 and having an arm 40 extending rearwardly toward the driver's seat. For convenience in operating the positive clutch from the driver's seat, the arm 40 is provided at its rear end with a yoke 41, engaging the lower end of a pivoted vertically disposed hand lever 42. The sleeve 20 is held from longitudinal movement on the shaft 7 by any preferred means, as for example the collars 43, 44, the latter of which is placed at the inner end of the sleeve between the two members of the positive clutch. It is to be noted that with the single exception of the clutch member 34, the apparatus is entirely supported upon the sleeve 20, and is therefore what might be termed "self contained" and the apparatus can be placed in position upon any shaft by placing the sleeve and clutch member 34 in proper relative position, and securing the collars 43 and 44 to the shaft, without preparing the shaft in any way to accommodate said parts. It will also be noted that the degree of frictional resistance between the friction faces of clutch members 21 and 25 is entirely regulated by the tension of the spring 31, and its adjusting nut 30, and cannot be increased or affected in any way by the operator in throwing the positive clutch into and out of operation. In order to provide means for calling the operator's attention to the fact that the friction clutch is slipping, for any reason as by the obstruction or clogging of the rotary cutter, I provide the friction clutch member 25 with a yielding projection, in line with the annular row of teeth or serrations 23 in the clutch member 21. In this instance I have shown the part 25 provided with a transverse aperture in line with said teeth 23, in which is located a loose pin 45, the outer end of which is engaged by a spring plate 46 (see Figs. 5 and 6) secured in place by a screw 47, which is conveniently provided with a locking washer 48 to prevent it from unscrewing, a split spring washer being suitable for this purpose.

In the operation of the device the spring 31 will be adjusted to provide sufficient friction between clutch members 21 and 25 to overcome any ordinary resistance of the rotary cutter, in normal operation. If the cutter encounters any abnormal resistance, as by the lodgment of a stick or stone, etc., the resistance of the friction surfaces will be instantly overcome, and the cutter will remain stationary while the shaft 7 continues to revolve, and the pin 45 in passing over the teeth or serrations 23, will set up a noise which will at once notify the operator, who will proceed to stop the machine and remove the cause of the trouble. By this means the danger of breaking or injuring the rotary cutter or its driving connections is entirely obviated.

As the members of the friction clutch are never given relative movement except in case of accident, there is practically no wear on the friction surfaces and the device is not likely to get out of order, or to require adjustment of any kind.

It will be noted that the clutch mechanism for the rotary cutter herein described is independent of the mechanism for propelling the machine over the ground and is, therefore, not affected in any way by said propelling mechanism.

What I claim and desire to secure by Letters Patent is:—

1. In a motor lawn mower provided with a motor, propelling mechanism and cutting mechanism including a rotary cutter, the combination with the rotary cutter, of a friction drive therefor comprising a driving shaft, a fixed friction clutch member loosely mounted on but held from longitudinal movement with respect to said shaft, a movable friction clutch member loose on the shaft, and movable longitudinally thereof, a spring surrounding said shaft and holding said clutch members in engagement with a predetermined pressure, a connection between said movable friction clutch member and the rotary cutter, and a separate clutch, for throwing the cutter into and out of operation, having a fixed member loosely mounted on the shaft and rigidly secured to the fixed friction clutch member, and a movable member secured to the shaft to rotate therewith but movable longitudinally of the shaft whereby the cutter can be thrown into and out of engagement without affecting the relation of the friction clutch members.

2. In a motor lawn mower provided with a motor, propelling mechanism and cutting mechanism including a rotary cutter, the combination with the rotary cutter, of a friction drive therefor comprising a driving shaft, a fixed friction clutch member loosely mounted on but held from longitudinal movement with respect to said shaft, a movable friction clutch member loose on the shaft, and movable longitudinally thereof, a spring surrounding said shaft and holding said clutch members in engagement with a predetermined pressure, a connection between said movable friction clutch member and the rotary cutter, and a separate clutch for throwing the cutter into and out of operation, having a fixed member loosely mounted on the shaft and rigidly secured to the fixed friction clutch member, and a movable member secured to the shaft to rotate therewith but movable longitudinally of the shaft, said friction clutch members being provided the one with a serrated portion and the other with a movable part for engaging said serrated portion.

3. In a motor lawn mower provided with a motor, propelling mechanism and cutting mechanism including a rotary cutter, the combination with the rotary cutter, of a friction drive for the cutter independent of the propelling mechanism, comprising a driving shaft connected with the motor, a sleeve loosely mounted on the shaft, a friction clutch member secured rigidly to said sleeve, a second friction clutch member loose on the sleeve, and operatively connected with the cutter, a spring carried by the sleeve, for holding the clutch members together with a predetermined pressure, a positive clutch member rigidly secured to the first mentioned friction clutch member, and a second positive clutch member secured to rotate with the driving shaft, and movable into and out of engagement with the other positive clutch member.

In testimony whereof I affix my signature, in the presence of two witnesses.

WILLIAM H. COLDWELL.

Witnesses:
E. C. Ross,
H. W. Nurtfeldt.